(12) United States Patent
Venkatsuresh et al.

(10) Patent No.: US 8,566,495 B2
(45) Date of Patent: Oct. 22, 2013

(54) SYSTEMS, METHODS AND APPARATUS FOR DATA COMMUNICATION

(75) Inventors: Ajay K. Venkatsuresh, San Diego, CA (US); Thomas Klingenbrunn, San Diego, CA (US)

(73) Assignee: QUALCOMM Incorporated

( * ) Notice: Subject to any disclaimer, the term of this patent is extended or adjusted under 35 U.S.C. 154(b) by 219 days.

(21) Appl. No.: 12/939,673

(22) Filed: Nov. 4, 2010

(65) Prior Publication Data

US 2011/0113164 A1 May 12, 2011

Related U.S. Application Data

(60) Provisional application No. 61/259,054, filed on Nov. 6, 2009, provisional application No. 61/259,323, filed on Nov. 9, 2009.

(51) Int. Cl.
*G06F 13/24* (2006.01)
*G06F 3/00* (2006.01)

(52) U.S. Cl.
USPC ............... 710/266; 710/15; 710/16; 710/18; 710/48

(58) Field of Classification Search
USPC .................... 710/15, 16, 18, 48, 266
See application file for complete search history.

(56) References Cited

U.S. PATENT DOCUMENTS

| | | | |
|---|---|---|---|
| 5,367,534 A * | 11/1994 | Chou et al. | 375/222 |
| 5,708,814 A * | 1/1998 | Short et al. | 710/260 |
| 6,119,190 A | 9/2000 | Garney | |
| 6,532,214 B1 * | 3/2003 | Rumsewicz | 370/236 |
| 2002/0196973 A1 * | 12/2002 | Schroder et al. | 382/167 |
| 2007/0016835 A1 * | 1/2007 | Hronik et al. | 714/727 |
| 2007/0233896 A1 * | 10/2007 | Hilt et al. | 709/238 |
| 2009/0077394 A1 * | 3/2009 | Tsai et al. | 713/310 |
| 2010/0165856 A1 * | 7/2010 | Melpignano et al. | 370/252 |

FOREIGN PATENT DOCUMENTS

| | | |
|---|---|---|
| EP | 1833008 A2 | 9/2007 |
| WO | WO2009039034 A1 | 3/2009 |

OTHER PUBLICATIONS

International Search Report and Written Opinion—PCT/US2010/055553, International Search Authority—European Patent Office—Mar. 2, 2011.
USB—Implementers Forum INC: "Universal Serial Bus Specification—Rev. 2.0; Chapters 5, 8," Universal Serial Bus Specification, Apr. 27, 2000, XP002330584.

* cited by examiner

*Primary Examiner* — Farley Abad
(74) *Attorney, Agent, or Firm* — Charles Chesney

(57) ABSTRACT

Implementations of systems, methods and apparatus include aspects of resource conservation strategies that may be useful for a USB compliant device that experiences resource limitations over durations longer than contemplated by the USB standards. Implementations of systems, methods and apparatus disclosed herein enable a USB compliant device to selectively process interrupts and/or other overhead resulting from USB communications between a host and the device. By not processing some interrupts and/or other overhead, based in part on the current level of resource utilization, a device can free up resources needed to process relatively high data-rate incoming traffic from the host. In some implementations, when locally implemented techniques prove to be insufficient, the device may optionally request that the host reduce the data-rate on the downlink.

60 Claims, 6 Drawing Sheets

US 8,566,495 B2

SYSTEMS, METHODS AND APPARATUS FOR DATA COMMUNICATION

CLAIM OF PRIORITY UNDER 35 U.S.C. §119

The present Application for Patent claims priority to both U.S. Provisional Application No. 61/259,054, entitled "RESOURCE CONSERVATION STRATEGIES FOR USB COMPLIANT DEVICES," filed Nov. 6, 2009, and U.S. Provisional Application No. 61/259,323, entitled "RESOURCE CONSERVATION STRATEGIES FOR USB COMPLIANT DEVICES," filed Nov. 9, 2009; both of which are hereby expressly incorporated by reference herein.

BACKGROUND

1. Field

The present application relates to regulating communication between devices, and in particular, to resource conservation for data communication protocol compliant devices.

2. Background

The Universal Serial Bus (USB) standard defines a data communication protocol for connecting electronic peripheral devices to a host device. Thus far, there have been three releases of the USB standard (USB 1.0, USB 2.0 and USB 3.0). The USB standard was originally conceived to replace non-standardized serial and parallel data ports on computers, which called for various device drivers to be developed and maintained. However, the ensuing popularity of the USB standard has made USB ports standard features on video game consoles, DVD players, smart phones, and a wide variety of other consumer electronics.

Peripherals are sometimes referred to as functions, and may include other computers and devices such as keyboards, scanners, digital cameras, printers, external storage devices, etc. The USB standard enables plug-and-play capabilities, meaning that peripheral devices can be connected and disconnected from a host without powering down or rebooting the host. Rather, when a device is first connected, the host enumerates and recognizes it, and loads the device driver needed for that device. The host and connected peripheral are then able to communicate data to one another.

SUMMARY

Various embodiments of systems, methods and devices within the scope of the appended claims each have several aspects, no single one of which is solely responsible for the desirable attributes described herein. Without limiting the scope of the appended claims, some prominent features are described herein. After considering this discussion, and particularly after reading the section entitled "Detailed Description" one will understand how the features of various embodiments are used to manage monitoring of a page channel or the like.

One aspect of the disclosure is an implementation for a method including sensing at least one signal indicative of a measurement of a corresponding resource located on a first device to support communication between the first device and a second device; determining a resource utilization value based on the at least one signal; and adjusting an operating parameter by selecting an operating parameter value based at least in part on the resource utilization value, wherein the operating parameter affects the processing of communication by the first device.

Another aspect of the disclosure is an implementation for a device including a monitoring entity configured to sense at least one signal indicative of a measurement of a corresponding resource located on the device to support communication between the device and a second device. The device also includes a controller configured to determine a resource utilization value based on the at least one signal; and adjust an operating parameter by selecting an operating parameter value based at least in part on the resource utilization value, wherein the operating parameter affects the processing of communication by the device.

Yet another aspect of the disclosure is an implementation for a device including means for sensing at least one signal indicative of a measurement of a corresponding resource located on the device to support communication between the device and a second device; means for determining a resource utilization value based on the at least one signal; and means for adjusting an operating parameter by selecting an operating parameter value based at least in part on the resource utilization value, wherein the operating parameter affects the processing of communication by the device.

Yet even another aspect of the disclosure is an implementation for a computer program product including computer readable medium comprising instructions, stored in a non-transitory memory, that when executed cause an apparatus to sense at least one signal indicative of a measurement of a corresponding resource located on a first device to support communication between the first device and a second device; determine a resource utilization value based on the at least one signal; and adjust an operating parameter by selecting an operating parameter value based at least in part on the resource utilization value, wherein the operating parameter affects the processing of communication by the first device.

BRIEF DESCRIPTION OF THE DRAWINGS

So that the manner in which features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

Figure 1:
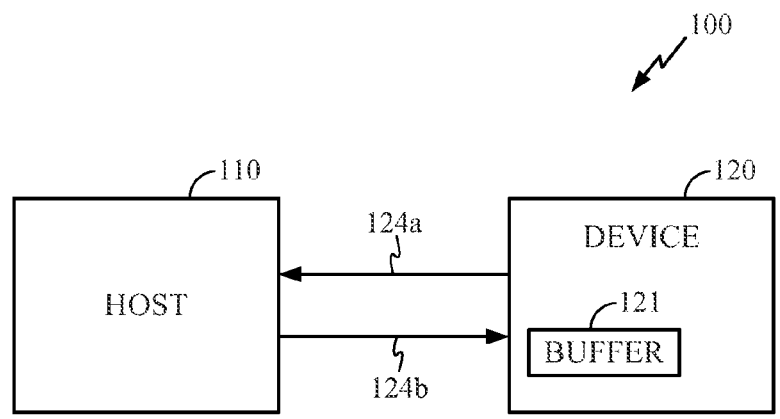
FIG. 1 is a simplified block diagram of a USB system.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Various aspects of embodiments within the scope of the appended claims are described below. It should be apparent that the aspects described herein may be embodied in a wide variety of forms and that any specific structure and/or function described herein is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

As noted above, USB ports are now included as standard features on a wide variety of electronic devices to enable the devices interface with a host controller and/or to enable devices to interface with one another. The host is typically a computer, but in numerous applications the host can also be a video game consol, a smart phone, a camera, a tablet computer or any other electronic device. There are also various types of devices that can interface with a host. For example, peripheral devices include hubs, other computers, mouse devices, keyboards, scanners, digital cameras, printers, external storage devices, etc.

Those skilled in the art will appreciate from the present disclosure that many of the types of devices that can be considered host devices can also be considered peripheral devices and vice versa. That is, a host and a peripheral device can be the same type of device. The USB standard provides the titles "host" and "peripheral device" as a convenient way of identifying which of the two devices has greater relative control over the data link that is established between the two devices according to the USB standard. The host functions as the primary controller of the USB data link, while the peripheral device has secondary control if at all.

Furthermore, devices in a USB system often connect to a USB host in a tiered star topology. In such a configuration, a USB system includes a polled bus in which a host controller includes a single USB controller that manages all communication on the bus and monitors the bus topology for changes due to devices being connected and/or disconnected.

While the USB system supports multiple peripherals connected to the bus, the USB protocol is a point-to-point protocol. In other words, a single host can send data to a single uniquely addressed device at a time. Thus, data for the various devices are time multiplexed so that each device can receive or transmit data during its time slot.

A USB system generally defines frames that are one millisecond long. Within that frame, the USB system may allocate different time slots to many or all of the devices on the bus. Each device has a unique address so the device knows that data transmitted is for it, or supplies the unique address with data it sends so the host knows from which device the data is received.

FIG. 1 is a simplified block diagram of a simple USB system 100 showing a single host 110 and a single device 120. As noted above, those skilled in the art will appreciate that one or more devices may be connected to a host, and that a single device has been shown in FIG. 1 merely to illustrate more pertinent aspects of implementations disclosed herein.

The host 110 and the device 120 share an uplink 124*a* and a downlink 124*b*. The uplink is used to communicate data from the device 120 to the host 110. The downlink is used to communicate data from the host 110 to the device. While the uplink 124*a* and downlink 124*b* have been illustrated as separate connections, those skilled in the art will appreciate that the uplink 124*a* and downlink 124*b* can exist on the same physical connection between the host 110 and the device 120. The uplink 124*a* and downlink 124*b* are typically included in the USB bus managed by the host 110. The device 120 also includes a buffer 121, which is used to temporarily store at least data received via the downlink 124*a*.

Most USB bus transactions include three packets. The host 110 sends a token packet describing the type and direction of the transaction, a device address, and an endpoint number. The device 120 that is addressed recognizes its address from the token packet. Data is transferred either from the host 110 to the addressed device 120 or from the addressed device 120 to the host 110 based on the direction specified in the token packet. In most, cases, the destination of the data responds with a handshake packet indicating a receipt status for the transferred data, which is described in greater detail below.

In operation, when the device 120 is first connected to the host 110, the device 120 goes through an initialization, enumeration, and configuration process to set up the device 120 for use by the host 110, and in some implementations, the client software thereon.

While the USB standards provide a convenient standardized interface that supports data-rates of the order of 480 Mbps (raw data-rates) on a USB link, relatively high data-rates pose unique challenges to devices with limited resources. The USB 2.0 standard provides peripheral devices with only a limited set of mechanisms for controlling the rate of the incoming data flow from the host. However, the flow-control mechanisms are of limited use, and can exacerbate limitations caused by resource constraints when the resources available to the peripheral device are limited over a relatively long duration and/or permanently. For example, some devices may be hand-held and/or portable devices that have limited resources. These resources may include, without limitation, available operating power, relatively small allotments of memory and processing power.

More specifically, currently available USB the flow-control mechanisms were designed to alleviate short term elevated demand caused by temporary constraints on the resources available to the device. In other words, the currently available USB 2.0 standard provides basic flow-control mechanisms that were designed based on the assumption that the resource constraints that trigger the flow-control mechanisms will last for a brief time-span. The available flow-control mechanisms do not provide an adequate solution to situations where a peripheral device has limited resources, such as available battery power.

With further reference to FIG. 1, According to the USB standards, one such flow-control mechanism specifies that every segment of data/control traffic sent over the link from the host 110 to the device 120 must be acknowledged in one of three possible ways. First, the device 120 sends a positive acknowledgement (ACK) when data is received error-free. Second, the device 120 send a negative acknowledgement (ERR) to denote cyclic redundancy check (CRC) failures, erroneous data reception and/or corruption over the USB link to the host 110. Third, the device 120 may send a NAK signal to the host 110 to flow-control the host 110.

A NAKs signal from the device 120 to the host 110 indicates to the host 110 that the device 120 is unable to process the incoming data due to temporary resource constraints. The host may attempt a retransmission as early as at the next micro-frame triggering more NAKs from the device 120 in the process.

For portable devices that are self-powered, and constrained at least by available battery power, this system is inefficient because the transmission of each NAK translates to wastage of battery power and bandwidth over the USB link. As an alternative, a PING protocol also defined in the USB standards helps reduce the generation of excessive NAK traffic on the bus, but even this mechanism is based on the assumption that the resource constraints that triggered the flow-control mechanisms will occur for short intervals. Hence even the PING protocol is fairly inefficient if the device is resource constrained for extended periods of time. But resources such as available battery power, memory and processing power are sometimes limited for portable devices over long durations and/or even permanently given the initial configuration of the portable device.

Implementations of systems, methods and apparatus include aspects of resource conservation strategies that may be useful for a USB compliant device that experiences resource limitations over durations longer than contemplated by the USB standards. Implementations of systems, methods and apparatus disclosed herein enable a USB compliant device to selectively process interrupts and/or other overhead resulting from USB communications between a host and the device. By not processing some interrupts and/or other overhead, based in part on the current level of resource utilization, a device can free up resources needed to process relatively high data-rate incoming traffic from the host. In some implementations, when locally implemented techniques prove to be insufficient, the device may optionally request that the host reduce the data-rate on the downlink.

Figure 2:
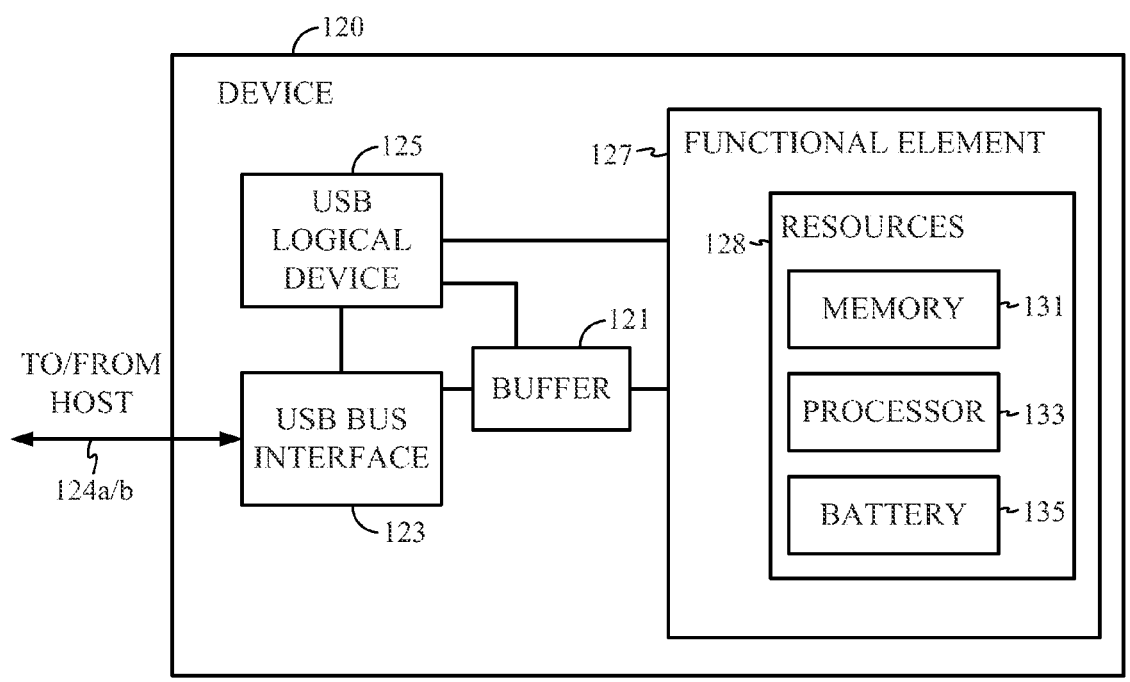
FIG. 2 is a simplified block diagram of an implementation of a peripheral device.

FIG. 2 is a simplified block diagram of an implementation of a peripheral device 120. The device 120 illustrated in FIG. 2 is similar to and adapted from the device 120 illustrated in FIG. 1. Accordingly, elements common to both devices share common reference indicia, and only differences between the devices are described herein for the sake of brevity. With reference to FIG. 2, the device 120 includes a USB bus interface 123, a USB logical device 125 and a functional element 127, as well as the aforementioned buffer 121 and uplink/downlink connection 124*a,b* described above. Those skilled in the art will appreciate that a USB compliant device may include other components, however the device 120 illustrated in FIG. 2 includes those components that are more pertinent to aspects of implementations within the ambit of the appended claims.

The USB bus interface 123, the USB logical device 125 and the functional element 127 comprise the USB stack of the device 120. In operation, the bus interface 123 is responsible for physical transmission of data (i.e. transmission/reception of packets over the link with a host), and the USB logical device 125 is responsible for routing the packets between the bus interface 123 and the individual endpoints on the device 120. The functional element 127 represents the actual functionality provided by the device 120 (e.g. digital camera).

The functional element 127 includes resources 128. The resources 128 include, without limitation, a memory 131, a processor 133 (or controller) and a battery 135 serving as the power source for the device 120. Those skilled in the art will appreciate from the present disclosure that the resources 128 may be shared by other components included on the device such as the bus interface 123 and logical device 125, and that the resources 128 are merely illustrated within the functional element 127 as one possible implementation.

In operation, the bus interface 123 sends an interrupt to the upper layers when a data transfer is completed successfully. The interrupt frequency is often implementation specific. For example, USB 2.0 operates on the micro-frame boundaries, where each micro-frame is 125 µsec long. Interrupts at the micro-frame boundaries usually lead to a high processing overhead. Hence most USB devices operate at lower interrupt frequencies, such as a milli-second (msec) boundary or the USB defined frame boundaries. The minimum interval between consecutive interrupts is often referred to as the minimum interrupt interval time. In response to an interrupt from the bus-controller, during a data phase, logical device 125 processes any data available in the buffer 121 that might have been received from the host. This processing consumes resources including, but not limited to, processing power, memory etc on the device 120. As noted above, the currently available USB standards do not provide a flow-control mechanism that provides an adequate solution to situations in which the resources 128 of the device 120 are constrained and/or limited for a relatively long duration.

Figure 3:
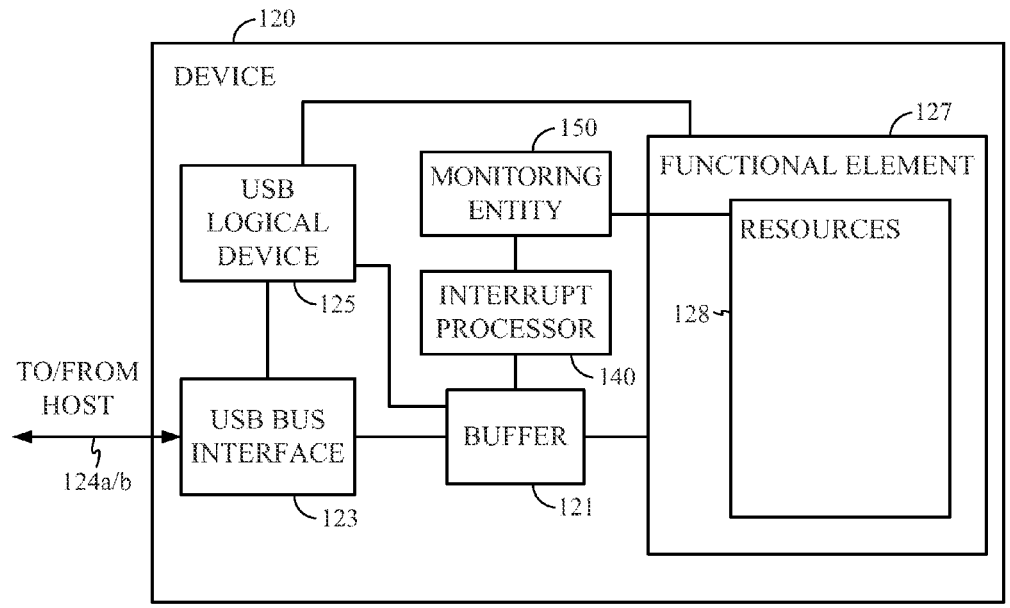
FIG. 3 is a simplified block diagram of an implementation of a peripheral device.

FIG. 3 is a simplified block diagram of an implementation of a peripheral device 120. The device 120 illustrated in FIG. 2 is similar to and adapted from the device 120 illustrated in FIG. 1. Accordingly, elements common to both devices share common reference indicia, and only differences between the devices are described herein for the sake of brevity. With reference to FIG. 3, the device 120 further includes a monitoring entity 150 and an interrupt processor.

The interrupt monitoring entity 150 senses signals indicative of measurements corresponding to one or more of the resources 128. As described in further detail below, one or more of the signals are converted into a resource utilization value. The resource utilization value is in turn provided to the interrupt processor 140. The interrupt processor 140 adjusts how the processing in response to the interrupts generated by the bus interface 123 occurs. In some implementations interrupt processor 140 also adjusts how the processing of data in a buffer above a threshold level occurs.

In one implementation, the total resource availability is quantized into N levels or bins. These levels can be addressed by the index n (where $1 \leq n \leq N$). In other words, if r denotes the percent of utilization of the resources under consideration, then level n corresponds to the cases where r falls in the range $Th_{MAX\_n-1} < r \leq Th_{MAX\_n}$, where $Th_{MAX\_n}$ denotes the upper threshold of resource utilization for a particular bin denoted by index n.

In one implementation, the levels denote progressively increasing levels of resource utilization. In other words, $Th_{MAX\_n-1} < Th_{MAX\_n}$. However, those skilled in the art will appreciate from the present disclosure that numerous other relationships can be defined amongst the levels, including that the levels denote progressively decreasing levels of resource utilization.

In one implementation, each level is assigned a minimum interrupt interval time value that may be used to gate the interrupts produced by the bus interface 123. For example, in operation, when the resource utilization crosses a particular threshold, the device 120 may have to reduce resource consumption. Beyond this threshold, the device can autonomously opt to conserve resources by adaptively switching to a lower interrupt frequency from the bus controller 123. This can be accomplished by dynamically changing the minimum interrupt interval time value corresponding to the bin n which is chosen based on the current levels of resource utilization. This process is further described with reference to FIG. 6.

As the interrupt frequency changes, the device 120 achieves gains from aggregation at the cost of latencies as the resource utilization increases. On the other hand, as the resource utilization level decreases, the device 120 increases the interrupt frequency back up to nominal levels. This allows the device 120 to reduce latencies, under normal operating conditions.

Further, the minimum interrupt interval value for each level can be chosen such that, the buffer 121 does not overflow at the determined level of resource utilization given the incoming data-rate. The minimum interrupt interval values for the respective levels are dependent on a particular implementation because a device 120 can have a wide variety of functions.

In another implementation, each level is assigned a probability value of processing in response to a received event-signal, such as an interrupt and/or the amount of data in a buffer breaching a threshold. In turn, the interrupt service routine may process the interrupts that signal data-transfers, with a probability of P. In other words, with a probability of (1−P), an interrupt denoting the end of data-transfer, may be dropped autonomously by the device 120, without any loss of data. A more detailed example of this process is discussed below with reference to FIG. 7.

Again, because a device 120 can have a wide variety of functions, the value of P at each level is dependent on a particular implementation, including the size of the available hard-ware buffers in order to avoid any possible data loss due to buffer over-flows. Further, in some implementations the value of P also factors in the current level of resource utilization, and the minimum interrupt interval time value used in the device.

Further, in another implementation, an interrupt is automatically serviced in order reduce and/or prevent data loss due to buffer overflow, if M consecutive previously received interrupts have not been serviced. In other words, after M consecutive un-serviced interrupts there is a risk that the device buffers will overflow. In order to reduce this risk, the next interrupt is automatically serviced. The probability of hitting M consecutive un-serviced interrupts is dependent on the probability value P for a given level.

Figure 4:
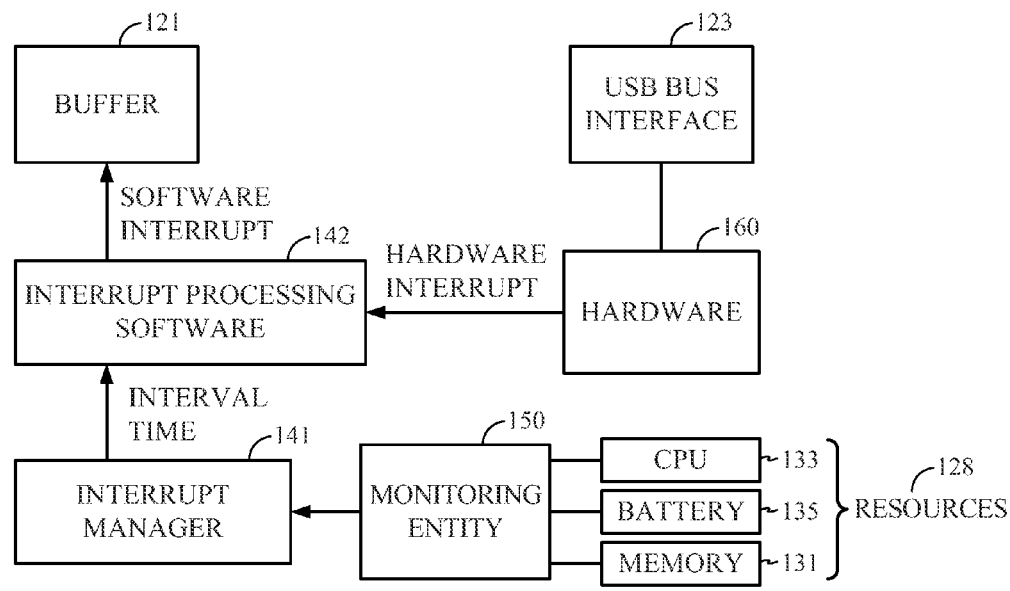
FIG. 4 is a simplified block diagram of an implementation of a peripheral device.

The various strategies disclosed herein can be implemented in either software, hardware, firmware or a combination thereof. FIG. 4 is a simplified block diagram of a software implementation in the device 120 shown in FIG. 3. The device 120 illustrated in FIG. 2 is similar to and adapted from the device 120 illustrated in FIG. 1. Accordingly, elements common to both devices share common reference indicia, and only differences between the devices are described herein for the sake of brevity.

With reference to FIG. 4, the device 120 includes a hardware component 160 that produces hardware interrupts. In one implementation, the hardware component 160 includes at least a portion of the bus interface 123 (shown in FIG. 3). The device 120 also includes two software modules. The first is an interrupt manager module 141 and the second is an interrupt processing software module 142.

In operation, the interrupt manager 141 receives a resource utilization value from the monitoring entity. In response, the interrupt manager 141 selects one of a minimum interrupt interval time value and a probability value in accordance with one of the implementations discussed above, and provides the value to the interrupt processing software 142. In response, the interrupt processing software 141 either gates the hardware interrupt using a new minimum interrupt interval time value or determining whether to drop the hardware interrupt using the probability value.

Figure 5:
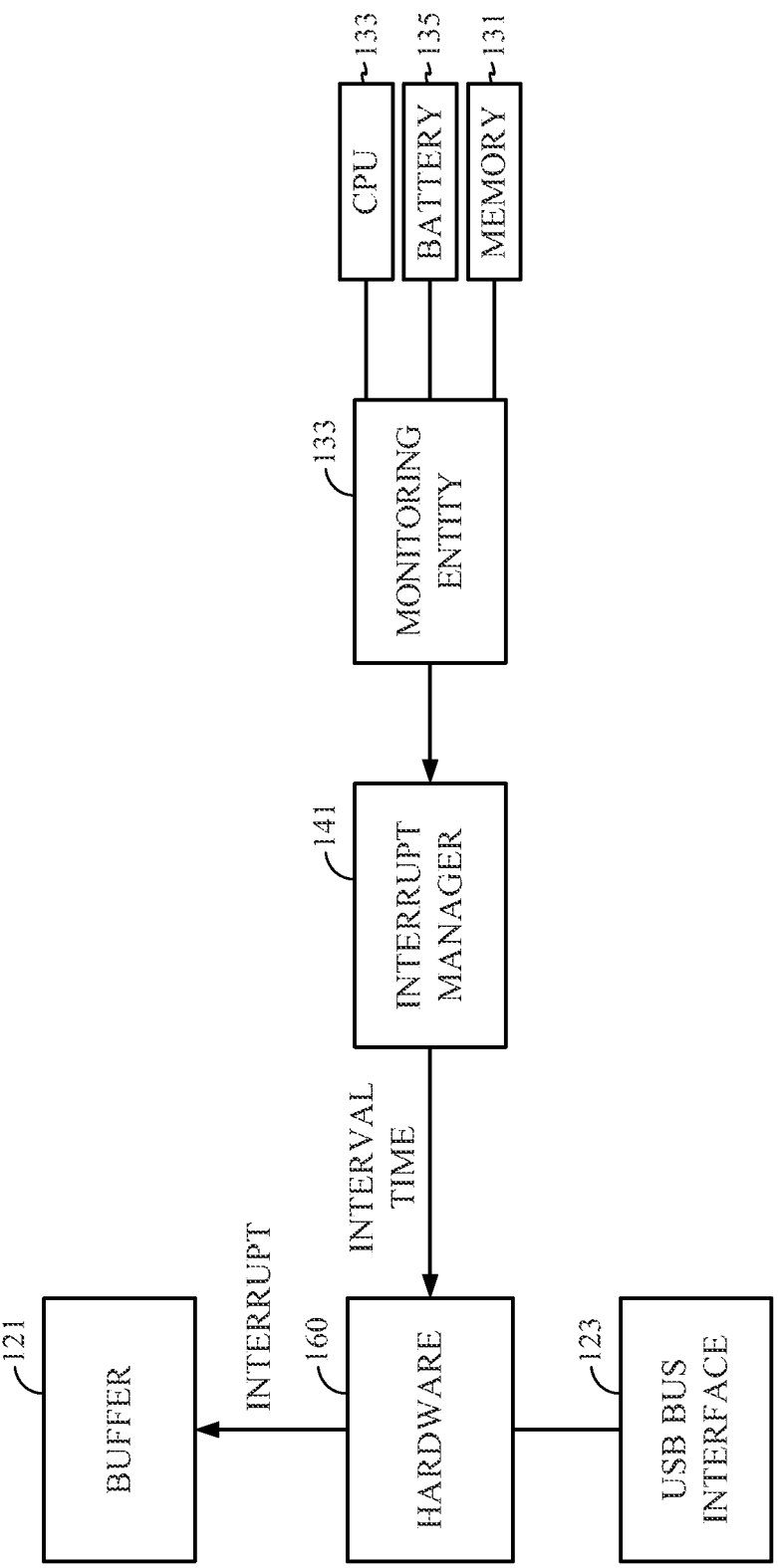
FIG. 5 is a simplified block diagram of an implementation of a peripheral device.

FIG. 5 is a simplified block diagram of a portion another alternative implementation of the device 120 shown in FIG. 3. The device 120 illustrated in FIG. 2 is similar to and adapted from the device 120 illustrated in FIG. 1. Accordingly, elements common to both devices share common reference indicia, and only differences between the devices are described herein for the sake of brevity.

With reference to FIG. 5, the device 120 includes a hardware component 160 that produces hardware interrupts. In one implementation, the hardware component 160 includes at least a portion of the bus interface 123 (shown in FIG. 3). The device 120 also includes a hardware implemented interrupt manager 141.

In operation, the interrupt manager 141 receives a resource utilization value from the monitoring entity. In response, the interrupt manager 141 selects one of a minimum interrupt interval time value and a probability value in accordance with one of the implementations discussed above, and provides the value to the hardware module 160. In response, the hardware module 160 either gates the hardware interrupt using a new minimum interrupt interval time value or determining whether to drop the hardware interrupt using the probability value.

Figure 6:
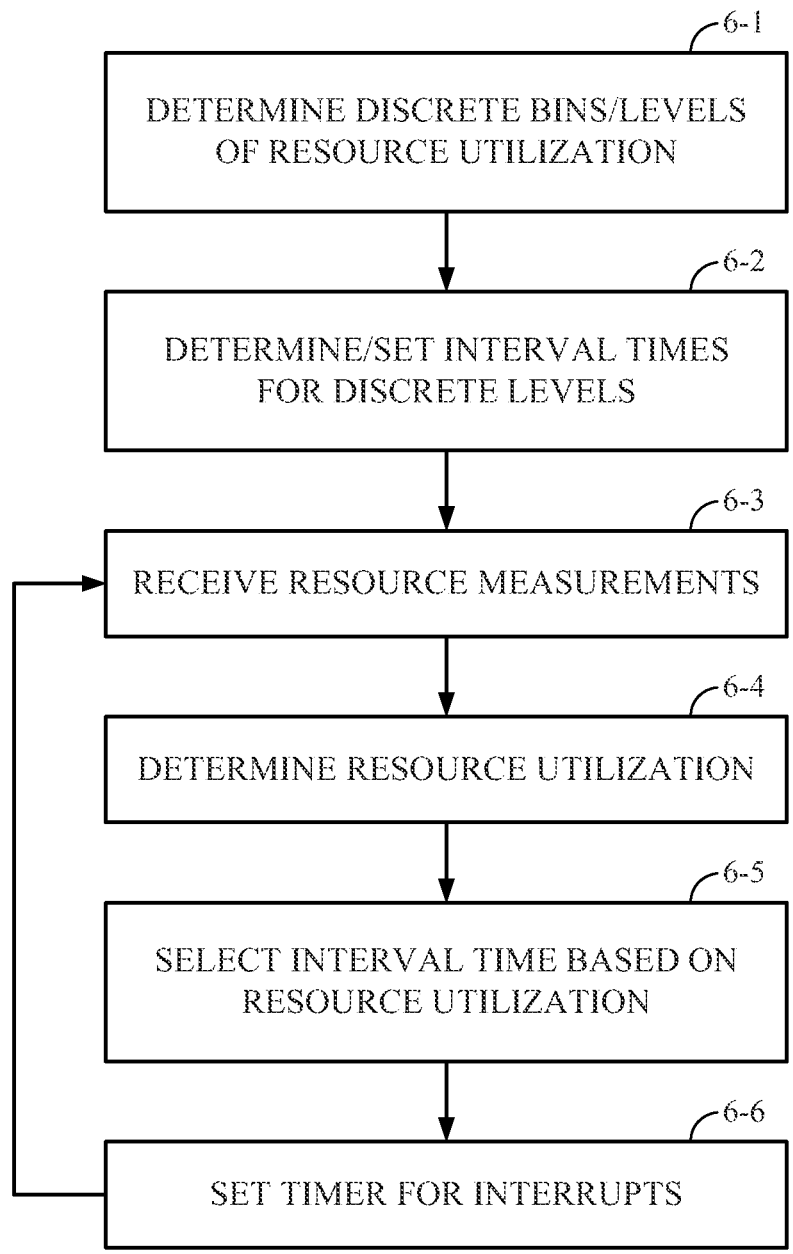
FIG. 6 is a flowchart of an implementation of a method.

FIG. 6 is a flowchart of an implementation of a method. As represented by block 6-1, the method includes determining two more discrete levels (or bins) of resource utilization based on the total resource availability within a device. As represented by block 6-2, the method includes one of determining and setting a respective minimum interrupt interval time value for each of the discrete levels of resource utilization. As represented by block 6-3, the method includes receiving resource measurements concerning one or more resources included on the device. As represented by block 6-4, the method includes determining a resource utilization value based on the resource measurements. As represented by block 6-5, the method includes selecting minimum interrupt interval time value based on the resource utilization value by mapping the resource utilization value to one of the predetermined resource utilization levels. As represented by block 6-6, the method includes setting a timer to gate interrupts using the selected minimum interrupt interval time value.

Figure 7:
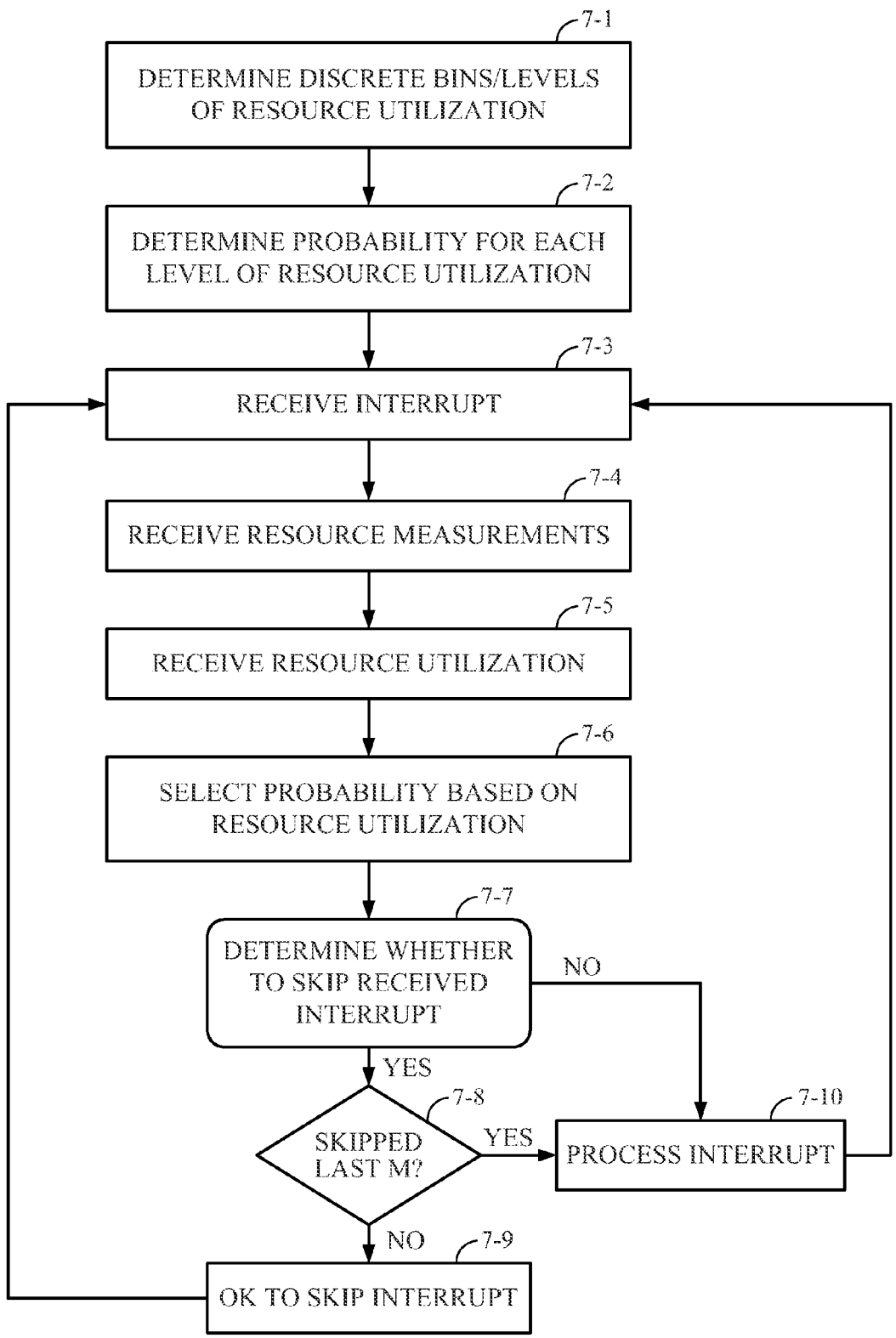
FIG. 7 is a flowchart of an implementation of a method.

FIG. 7 is a flowchart of an implementation of a method. As represented by block 7-1, the method includes determining two more discrete levels (or bins) of resource utilization based on the total resource availability within a device. As represented by block 7-2, the method includes one of determining and setting a respective probability value for each of the discrete levels of resource utilization. As represented by block 7-3, the method includes receiving an interrupt from a data link interface, such as for example a bus interface. As represented by block 7-4, the method includes receiving resource measurements concerning one or more resources included on the device. As represented by block 7-5, the method includes determining a resource utilization value based on the resource measurements. As represented by block 7-6, the method includes selecting probability value based on the resource utilization value by mapping the resource utilization value to one of the predetermined resource utilization levels.

As represented by block 7-7, the method includes determining whether to skip the processing associated with the received interrupt based on the probability value. In one example implementation, the number is randomly generated and compared to the probability value. If the randomly generated number is greater than the probability value, the associated processing occurs in response to the received the interrupt. On the other hand, if the randomly generated number is less than the probability value, the associated processing is skipped. With further reference to block 7-7, if it is determined that the associated processing should not be skipped based on the probability value (No path from 7-7), the method includes proceeding to the portion of the method represented by block 7-10. On the other hand, if it is determined that the associated processing should be skipped based on the probability value (Yes path from 7-7), the method includes proceeding to the portion of the method represented by block 7-8.

With reference to block 7-8, the method includes determining whether the previous M received interrupts have been skipped. If the previous M interrupts have been skipped (Yes path from 7-8), as represented by block 7-10, the method includes performing the processing associated with the received interrupt before returning to the portion of the method represented by block 7-3. On the other hand, if the previous M interrupts have not been skipped (No path from 7-8), as represented by block 7-9, the method includes skipping the processing associated with the received interrupt and returning to the portion of the method represented by block 7-3.

Figure 8:
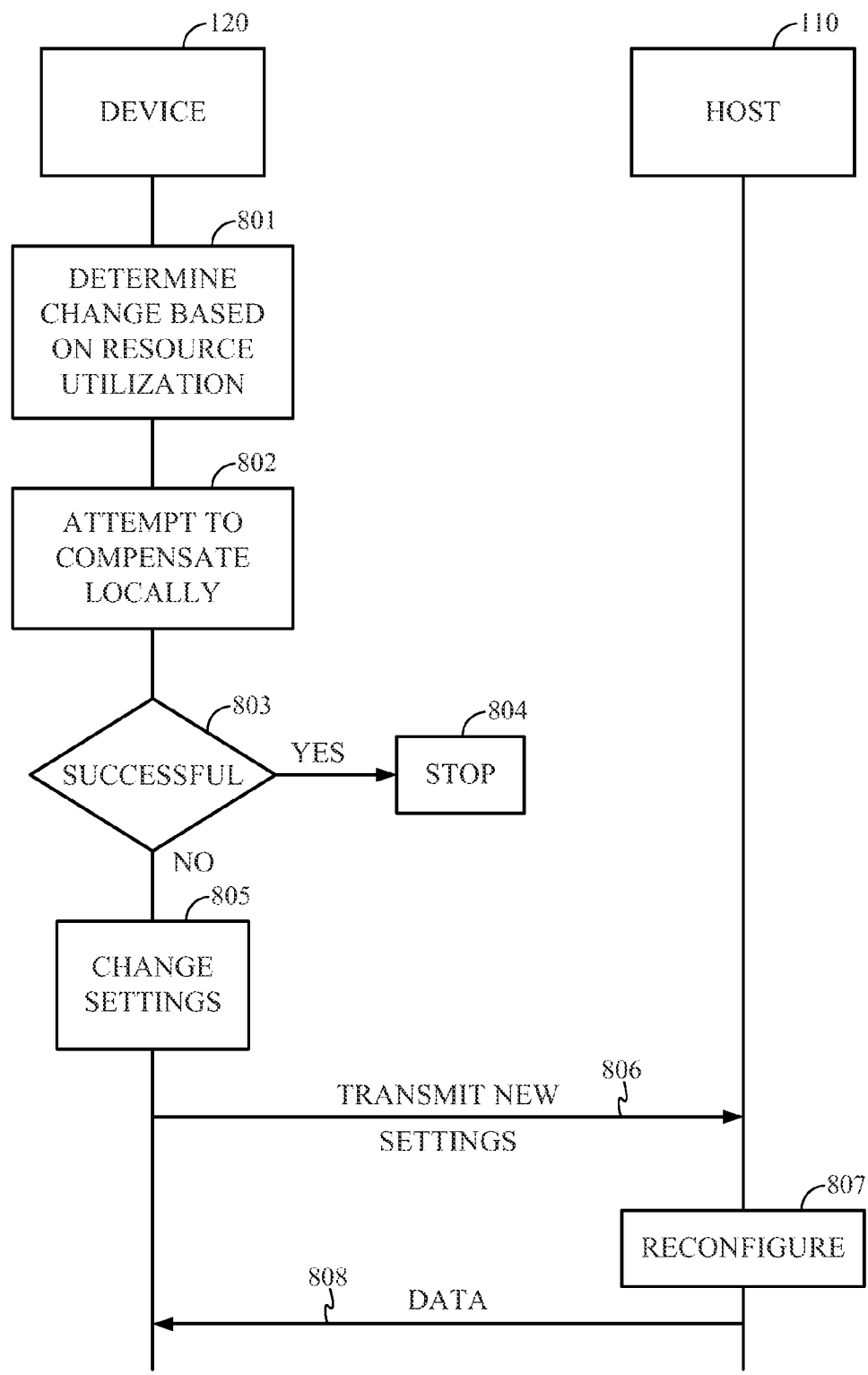
FIG. 8 is a signal diagram of an implementation of a method.

With further reference to FIG. 3, there may be circumstances where the aforementioned methods insufficiently affect flow-control from the host 110. In such circumstances the device 120 may optionally send a request to the host 110 to lower the transmission data-rate. FIG. 8 is a signal diagram of an implementation of such a method.

As represented by block 801, the device 120 determines whether to change an operating parameter based on a current level of resource utilization, in accordance with one of the examples discussed above. As represented by block 802, the device 120 attempts to compensate locally in accordance with one of the example discussed above. As represented by block 803, the device determines whether the local compensation effort was successful. If the local compensation effort was successful (Yes path from 803), as represented by block 804 the device 120 does not need to take further action. On the other hand, if the local compensation effort was not sufficient (No path from 803), as represented by block 805 the device 120 changes one or more operating setting affecting the data link. As represented by signal 806, the device 120 transmits the new settings to the host 110. As represented by block 807, the host 110 reconfigures the data link. As represented by signal 808, the host transmits data to the device 120 under the new settings.

USB compliant devices may enumerate multiple alternate settings at the time of initialization, for each supported configuration. Each alternate setting may include parameters such as the supported data rates for each endpoint.

As such in one implementation, USB compliant devices support multiple alternate settings, each with a different set of maximum supported data rates for the individual data rates. Further, if a device is resource constrained, the device may send a pre-determined, implementation specific signal to the host. For instance, this could be multiple stall tokens on the associated control pipe for a particular function, multiple back-to-back time-outs or even a custom implementation specific control token that can be interpreted by the host software. This signal could then be used to trigger a re-evaluation of the data-rates by the host software layer. In one implementation, if the device sends the pre-determined signal to the host to trigger flow-control, then in response the host software triggers transition to an alternate setting that involves lower data-rates in order to help the device conserve resources. Additionally and/or alternatively, if a device eventually determines that the data rates corresponding to the newly renegotiated alternate settings are too high as well, then the device could repeat the flow-control signal to the host and the host could switch to a more conservative alternate setting.

This approach can be implemented to reduce the generation of NAK tokens for an extended period of time. Also, since the device and the host can establish a mechanism for adjusting data rates based on available resources, the data rates can be adjusted based on the most recent device status, thereby ensuring that the device is not forced to expend additional power in order to flow-control the host. In other words, the cost of flow-controlling the host is reduced, since flow-control is not performed per-microframe as described in the USB specifications, but is performed at a much lower frequency.

The USB 2.0 standard partially addresses the problem of excessive link bandwidth/resource wastage due to flow-control for a particular function/endpoint, with the introduction of NAK limiting functionality using the aforementioned PING protocol. When the device flow-controls the host by responding with NAKs for OUT tokens, the host may poll the device status using PING packets. The device may then respond with ACK/NAK to these PING special tokens, based on the current device status. ACK response to PING indicates device can accept more data, while NAK response to PING.

While the PING tokens provide a useful mechanism to reduce the NAK bandwidth and resource wastage for OUT tokens, the inherent problem with this mechanism is that the USB standards do not impose any restrictions on the frequency of the PING tokens. For example, the USB 2.0 standard mandates that the device must be capable to handling PING tokens as frequently as at consecutive micro-frames, though the host may issue PING tokens at almost any frequency.

To resolve this issue, in one implementation, the host follows an exponential back-off mechanism during repeated PING transmissions. When the host issues the first PING token, the host starts a timer at an initial value. If the device responds with a NAK, the host waits until a timer expires before issuing the next PING token. For every consecutive PING transaction, the value of the timer is increased by a multiplicative factor, until a certain maximum value is reached for PING backoffs. The maximum value can be determined based on the individual function and device characteristics and is thus implementation specific.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The above description is provided to enable any person skilled in the art to make or use embodiments within the scope of the appended claims. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method comprising:
   sensing at least one signal indicative of a measurement of a corresponding resource located on a first device to support communication between the first device and a second device;
   determining a resource utilization value based on the at least one signal;
   determining an operating parameter value based at least in part on the resource utilization value, wherein the operating parameter value comprises at least one of a minimum interrupt interval time value between consecutive interrupts and a probability value of processing an event-signal, wherein the event-signal comprises at least an interrupt; and
   adjusting communication-related processing performed by the first device based at least in part on the operating parameter value,
   wherein adjusting the communication-related processing comprises at least one of gating the interrupt using the minimum interrupt interval time value and determining whether to drop the interrupt based on the probability value.

2. The method of claim 1,
   wherein determining the resource utilization value comprises determining discrete levels of resource utilization based on the at least one signal; and
   wherein determining the operating parameter value comprises determining the operator parameter value for each of the discrete levels of resource utilization.

3. The method of claim 2, wherein each discrete level of resource utilization is defined at least in part by at least one of a lower threshold and an upper threshold.

4. The method of claim 1, wherein gating the interrupt further comprises gating an interrupt generated by a data link interface with the minimum interrupt interval time value.

5. The method of claim 4, wherein the interrupt generated by the data link interface comprises at least one of a software interrupt and a hardware interrupt.

6. The method of claim 4, wherein the gating comprises at least one of software gating and hardware gating.

7. The method of claim 4, wherein the data link interface comprises a bus interface as defined by at least one of the releases of the Universal Serial Bus standard.

8. The method of claim 1, wherein the event-signal is at least one of the interrupt generated by a data link interface and an indicator that an amount of data in a buffer has crossed a threshold.

9. The method of claim 8, further comprising:
receiving the interrupt from the data link interface; and
determining whether to process in response to receiving the interrupt based at least in part on one of the probability value and prior determinations of whether to process a prior interrupt.

10. The method of claim 9, wherein determining whether to process in response to receiving the interrupt further comprises:
comparing a randomly generated number to the probability value; and
processing in response to receiving the interrupt based on the comparison.

11. The method of claim 10, wherein the probability value comprises one of a first probability of not processing in response to receiving the interrupt and a second probability of processing in response to receiving the interrupt.

12. The method of claim 9, wherein determining whether to process in response to receiving the interrupt further comprises:
electing not to process when processing occurred in response to a combination of previously received interrupts; and
electing to process when processing did not occur in response to the combination of previously received interrupts.

13. The method of claim 9, wherein processing in response to one of receiving the interrupt and the threshold amount of data in the buffer comprises processing at least one of the interrupt and the data in the buffer.

14. The method of claim 1, further comprising:
evaluating a change in operating performance in response to the adjustment made to the operating parameter;
determining whether to adjust a transmissions setting regarding a data link between the first device and the second device based on evaluating the change in operating performance; and
transmitting a signal indicative of a request to change the transmissions setting to the second device.

15. A device comprising:
a monitoring entity configured to sense at least one signal indicative of a measurement of a corresponding resource located on the device to support communication between the device and a second device; and
a controller configured to:
determine a resource utilization value based on the at least one signal;
determine an operating parameter value based at least in part on the resource utilization value, wherein the operating parameter value comprises at least one of a minimum interrupt interval time value between consecutive interrupts and a probability value of processing an event-signal, wherein the event-signal comprises at least an interrupt; and
adjust communication-related processing performed by the first device based at least in part on the operating parameter value,
wherein to adjust the operating parameter, the controller is further configured to at least one of gate the hardware interrupt using a new minimum interrupt interval time value and determine whether to drop the hardware interrupt using the probability value.

16. The device of claim 15, wherein to determine the resource utilization value, the controller is further configured to
determine discrete levels of resource utilization based on the at least one signal; and
wherein to determine the operating parameter value, the controller is further configured to determine the operating parameter value for each of the discrete levels of resource utilization.

17. The device of claim 16, wherein each discrete level of resource utilization is defined at least in part by at least one of a lower threshold and an upper threshold.

18. The device of claim 15, wherein to gate the interrupt, the controller is further configured to gate an interrupt generated by a data link interface with the minimum interrupt interval time value.

19. The device of claim 18, wherein the interrupts interrupt generated by the data link interface comprise comprises at least one of a software interrupts interrupt and a hardware interrupts interrupt.

20. The device of claim 18, wherein the gating comprises at least one of software gating and hardware gating.

21. The device of claim 18, wherein the data link interface comprises a bus interface as defined by at least one of the releases of the Universal Serial Bus standard.

22. The device of claim 15, wherein the event-signal is the interrupt generated by a data link interface.

23. The device of claim 22, wherein the controller is further configured to:
receive an the interrupt from the data link interface; and
determine whether to process in response to the received receiving the interrupt based at least in part on one of the selected probability value and prior determinations of whether to process a prior interrupt.

24. The device of claim 23, wherein to determine whether to process in response to receiving the interrupt, the controller is further configured to:
compare a randomly generated number to the probability value; and
process in response to receiving the interrupt based on the comparison.

25. The device of claim 24, wherein the selected probability value comprises one of a first probability of not processing in response to a received receiving the interrupt and a second probability of processing in response to a received receiving the interrupt.

26. The device of claim 23, wherein to determine whether to process in response to receiving the interrupt, the controller is further configured to:
elect not to process when processing occurred in response to a combination of previously received interrupts; and
elect to process when processing did not occur in response to the combination of previously received interrupts.

27. The device of claim 23, wherein processing in response to one of receiving the received interrupt and the threshold amount of data in the buffer comprises processing at least one of the interrupt and the data in the buffer.

28. The device of claim 15, wherein the controller is further configured to:
evaluate a change in operating performance in response to the adjustment made to the operating parameter;
determine whether to adjust a transmissions setting regarding a data link between the first device and the second device based on evaluating the change in operating performance; and transmit a signal indicative of a request to change the transmissions setting to the second device.

29. A device comprising:
means for sensing at least one signal indicative of a measurement of a corresponding resource located on the device to support communication between the device and a second device;
means for determining a resource utilization value based on the at least one signal;
means for determining an operating parameter value based at least in part on the resource utilization value, wherein the operating parameter value comprises at least one of a minimum interrupt interval time value between consecutive interrupts and a probability value of processing an event-signal, wherein the event-signal comprises at least an interrupt; and
means for adjusting communication-related processing performed by the first device based at least in part on the operating parameter value,
wherein adjusting the operating parameter comprises at least one of gating the hardware interrupt using a new minimum interrupt interval time value and determining whether to drop the hardware interrupt using the probability value.

30. The device of claim 29, further comprising:
wherein the means for determining the resource utilization value comprises means for determining discrete levels of resource utilization based on the at least one signal; and
wherein the means for determining the operating parameter value comprises determining the operator parameter value for each of the discrete levels of resource utilization.

31. The device of claim 30, wherein each discrete level of resource utilization is defined at least in part by at least one of a lower threshold and an upper threshold.

32. The device of claim 29, wherein gating the interrupt further comprises means for gating an interrupt generated by a data link interface with the minimum interrupt interval time value.

33. The device of claim 32, wherein the interrupt generated by the data link interface comprises at least one of a software interrupt and a hardware interrupt.

34. The device of claim 32, wherein the gating means comprises at least one of software gating and hardware gating.

35. The device of claim 32, wherein the data link interface comprises a bus interface as defined by at least one of the releases of the Universal Serial Bus standard.

36. The device of claim 29, wherein the event-signal is the interrupt generated by a data link interface.

37. The device of claim 36, further comprising:
means for receiving an the interrupt from the data link interface; and
means for determining whether to process in response to the received receiving the interrupt based at least in part on one of the selected probability value and prior determinations of whether to process a prior interrupt.

38. The device of claim 37, wherein the means for determining whether to process in response to receiving the interrupt further comprises means for:
comparing a randomly generated number to the probability value; and
processing in response to receiving the interrupt based on the comparison.

39. The device of claim 38, wherein the selected probability value comprises one of a first probability of not processing in response to a received receiving the interrupt and a second probability of processing in response to a received receiving the interrupt.

40. The device of claim 37, wherein means for determining whether to process in response to receiving the interrupt further comprises means for:
electing not to process when processing occurred in response to a combination of previously received interrupts; and
electing to process when processing did not occur in response to the combination of previously received interrupts.

41. The device of claim 37, wherein processing in response to receiving the interrupt comprises processing at least one of the interrupt and the data in a buffer.

42. The device of claim 29, further comprising:
means for evaluating a change in operating performance in response to the adjustment made to the operating parameter;
means for determining whether to adjust a transmissions setting regarding a data link between the first device and the second device based on evaluation the change in operating performance; and
means for transmitting a signal indicative of a request to change the transmissions setting to the second device.

43. A computer program product comprising a non-transitory computer readable medium comprising instructions, that when executed cause an apparatus to:
sense at least one signal indicative of a measurement of a corresponding resource located on a first device to support communication between the first device and a second device;
determine a resource utilization value based on the at least one signal;
determine an operating parameter value based at least in part on the resource utilization value, wherein the operating parameter value comprises at least one of a minimum interrupt interval time value between consecutive interrupts and a probability value of processing an event-signal, wherein the event-signal comprises at least an interrupt; and
adjust communication-related processing performed by the first device based at least in part on the operating parameter value,
wherein the instructions that cause the apparatus to adjust the operating parameter comprise instructions to at least one of gate the hardware interrupt using a new minimum interrupt interval time value and determine whether to drop the hardware interrupt using the probability value.

44. The computer program product of claim 43,
wherein the instructions that cause the apparatus to determine the resource utilization value comprises instructions to determine discrete levels of resource utilization based the at least one signal; and
wherein the instructions that cause the apparatus to determine the operating parameter value comprises determining the operator parameter value for each of the discrete levels of resource utilization.

45. The computer program product of claim 44, wherein each discrete level of resource utilization is defined at least in part by at least one of a lower threshold and an upper threshold.

46. The computer program product of claim 43, wherein the instructions that cause an apparatus to gate the interrupt comprises instructions to gate an interrupt generated by a data link interface with the minimum interrupt interval time value.

47. The computer program product of claim 46, wherein the interrupt generated by the data link interface comprise at least one of a software interrupt and a hardware interrupt.

48. The computer program product of claim 46, wherein the gating comprises at least one of software gating and hardware gating.

49. The computer program product of claim 46, wherein the data link interface comprises a bus interface as defined by at least one of the releases of the Universal Serial Bus standard.

50. The computer program product of claim 43, wherein the event-signal is an interrupt generated by a data link interface.

51. The computer program product of claim 50, further comprising instructions that cause the apparatus to:
    receive the interrupt from the data link interface; and
    determine whether to process in response to the received receiving the interrupt based at least in part on one of the selected probability value and prior determinations of whether to process a prior interrupt.

52. The computer program product of claim 51, wherein the instructions that cause the apparatus to process in response to receiving the interrupt further comprise instructions to:
    compare a randomly generated number to the selected probability value; and
    process in response to receiving the received interrupt based on the comparison.

53. The computer program product of claim 52, wherein the selected probability value comprises one of a first probability of not processing in response to a received receiving the interrupt and a second probability of processing in response to a received receiving the interrupt.

54. The computer program product of claim 51, wherein the instructions that cause the apparatus to process in response to receiving the interrupt further comprise instructions to:
    elect not to process when processing occurred in response to a combination of previously received interrupts; and
    elect to process when processing did not occur in response to the combination of previously received interrupts.

55. The computer program product of claim 51, wherein processing in response to one of receiving the received interrupt and the threshold amount of data in the buffer comprises processing at least one of the interrupt and the data in the buffer.

56. The computer program product of claim 43, further comprising instructions that cause the apparatus to:
    evaluate a change in operating performance in response to the adjustment made to the operating parameter;
    determine whether to adjust a transmissions setting regarding a data link between the first device and the second device based on evaluating the change in operating performance; and
    transmit a signal indicative of a request to change the transmissions setting to the second device.

57. A method comprising:
    at least one of providing and determining discrete levels of resource utilization based on one or more resources located on the first device to support communication;
    at least one of providing and determining a respective operating parameter value for each of the discrete levels of resource utilization, wherein at least one operating parameter comprises a probability value of processing in response to a received event-signal, wherein the event-signal is at least one of an interrupt generated by a data link interface and an indicator that the amount of data in a buffer has crossed a threshold;
    receiving an interrupt from a data link interface;
    sensing at least one signal indicative of a measurement of a corresponding resource located on a first device to support communication between the first device and a second device;
    determining a resource utilization value based on the at least one signal;
    determining whether to process in response to the received interrupt based at least in part on one of a selected probability value and prior determinations; and
    adjusting an operating parameter by selecting the operating parameter value based at least in part on the resource utilization value, wherein the operating parameter affects the processing of communication by the first device, and
    wherein adjusting the operating parameter comprises selecting one of the operating parameter values for the operating parameter based at least in part on the resource utilization value.

58. A device comprising:
    a monitoring entity configured to sense at least one signal indicative of a measurement of a corresponding resource located on the device to support communication between the device and a second device; and
    a controller configured to:
        at least one of provide and determine discrete levels of resource utilization based on one or more resources located on the first device to support communication;
        at least one of provide and determine a respective operating parameter value for each of the discrete levels of resource utilization, wherein at least one operating parameter comprises a probability value of processing in response to a received event-signal, wherein the event-signal is at least one of an interrupt generated by a data link interface and an indicator that the amount of data in a buffer has crossed a threshold;
        receive an interrupt from a data link interface;
        determine a resource utilization value based on the at least one signal;
        determine whether to process in response to the received interrupt based at least in part on one of a selected probability value and prior determinations; and
        adjust an operating parameter by selecting the operating parameter value based at least in part on the resource utilization value, wherein the operating parameter affects the processing of communication by the first device, and
        wherein adjusting the operating parameter comprises selecting one of the operating parameter values for the operating parameter based at least in part on the resource utilization value.

59. A device comprising:
    means for at least one of providing and determining discrete levels of resource utilization based on one or more resources located on the first device to support communication;
    means for at least one of providing and determining a respective operating parameter value for each of the discrete levels of resource utilization, wherein at least one operating parameter comprises a probability value of processing in response to a received event-signal, wherein the event-signal is at least one of an interrupt generated by a data link interface and an indicator that the amount of data in a buffer has crossed a threshold;
    means for receiving an interrupt from a data link interface;

means for sensing at least one signal indicative of a measurement of a corresponding resource located on a first device to support communication between the first device and a second device;

means for determining a resource utilization value based on the at least one signal;

means for determining whether to process in response to the received interrupt based at least in part on one of a selected probability value and prior determinations; and means for adjusting an operating parameter by selecting the operating parameter value based at least in part on the resource utilization value, wherein the operating parameter affects the processing of communication by the first device, and wherein adjusting the operating parameter comprises selecting one of the operating parameter values for the operating parameter based at least in part on the resource utilization value.

60. A computer program product comprising a non-transitory computer readable medium comprising instructions, that when executed cause an apparatus to:

at least one of provide and determine discrete levels of resource utilization based on one or more resources located on the first device to support communication;

at least one of provide and determine a respective operating parameter value for each of the discrete levels of resource utilization, wherein at least one operating parameter comprises a probability value of processing in response to a received event-signal, wherein the event-signal is at least one of an interrupt generated by a data link interface and an indicator that the amount of data in a buffer has crossed a threshold;

receive an interrupt from a data link interface;

sense at least one signal indicative of a measurement of a corresponding resource located on a first device to support communication between the first device and a second device;

determine a resource utilization value based on the at least one signal;

determine whether to process in response to the received interrupt based at least in part on one of a selected probability value and prior determinations; and adjust an operating parameter by selecting the operating parameter value based at least in part on the resource utilization value, wherein the operating parameter affects the processing of communication by the first device, and wherein adjusting the operating parameter comprises selecting one of the operating parameter values for the operating parameter based at least in part on the resource utilization value.

* * * * *